US012431076B2

(12) United States Patent
Lee et al.

(10) Patent No.: US 12,431,076 B2
(45) Date of Patent: Sep. 30, 2025

(54) DISPLAY APPARATUS

(71) Applicant: Samsung Display Co., Ltd., Yongin-Si (KR)

(72) Inventors: Seungwoo Lee, Yongin-si (KR); Sihun Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/953,154

(22) Filed: Nov. 20, 2024

(65) Prior Publication Data

US 2025/0246124 A1 Jul. 31, 2025

(30) Foreign Application Priority Data

Jan. 30, 2024 (KR) ........................ 10-2024-0013970

(51) Int. Cl.
*G09G 3/32* (2016.01)

(52) U.S. Cl.
CPC ......... *G09G 3/32* (2013.01); *G09G 2310/027* (2013.01); *G09G 2320/0233* (2013.01); *G09G 2320/0242* (2013.01); *G09G 2320/0276* (2013.01); *G09G 2320/0673* (2013.01); *G09G 2320/0693* (2013.01); *G09G 2330/023* (2013.01); *G09G 2330/10* (2013.01)

(58) Field of Classification Search
CPC ............... G09G 3/32; G09G 2310/027; G09G 2320/0233; G09G 2320/0242; G09G 2320/0276; G09G 2320/0673; G09G 2320/0693; G09G 2330/023; G09G 2330/10
See application file for complete search history.

(56) References Cited

U.S. PATENT DOCUMENTS

| | | | | |
|---|---|---|---|---|
| 10,376,786 B2 | 8/2019 | Lee et al. | | |
| 10,650,747 B2 * | 5/2020 | Cho | G09G 3/3258 | |
| 11,574,602 B2 * | 2/2023 | Yoo | G09G 3/2007 | |
| 2009/0278869 A1 * | 11/2009 | Oishi | G09G 3/2081 | 345/691 |

(Continued)

FOREIGN PATENT DOCUMENTS

| | | |
|---|---|---|
| KR | 10-2004-0059635 A | 7/2004 |
| KR | 10-2011-0090489 A | 8/2011 |

(Continued)

*Primary Examiner* — Andrew Sasinowski
(74) *Attorney, Agent, or Firm* — Innovation Counsel LLP

(57) ABSTRACT

A display apparatus includes a display panel including a normal pixel and an abnormal pixel having a driving voltage range different from the normal pixel, a gate driver applying a gate signal to the display panel, a gamma reference voltage generator outputting a first gamma reference voltage group and a second gamma reference voltage group, a data driver outputting a first data voltage based on the first gamma reference voltage group and a second data voltage based on the second gamma reference voltage group and a driving controller configured to control the gate driver, the gamma reference voltage generator and the data driver. The normal pixel receives the first data voltage and the abnormal pixel receives the second data voltage. A first voltage range of the first gamma reference voltage group is inconsistent with a second voltage range of the second gamma reference voltage group.

20 Claims, 10 Drawing Sheets

(56) References Cited

U.S. PATENT DOCUMENTS

| | | | | |
|---|---|---|---|---|
| 2023/0215390 | A1* | 7/2023 | Jeong | G09G 3/3688<br>345/690 |

FOREIGN PATENT DOCUMENTS

| | | | |
|---|---|---|---|
| KR | 10-2012-0037661 | A | 4/2012 |
| KR | 10-2021-0083947 | A | 7/2021 |
| KR | 10-2438199 | B1 | 8/2022 |

* cited by examiner

DISPLAY APPARATUS

CROSS-REFERENCE TO RELATED APPLICATION(S)

This application claims priority under 35 USC § 119 to Korean Patent Application No. 10-2024-0013970, filed on Jan. 30, 2024, in the Korean Intellectual Property Office (KIPO), the content of which is herein incorporated by reference in its entirety.

BACKGROUND

1. Field

Embodiments of the present inventive concept relate to a display apparatus.

2. Description of the Related Art

Generally, a display apparatus includes a display panel and a panel driver. The display panel includes a plurality of gate lines, a plurality of data lines and a plurality of pixels. The display panel driver includes a gate driver providing a gate signal to the gate lines, a data driver providing a data voltage to the data lines and a driving controller controlling the gate driver and the data driver. In the display apparatus, a dark point or a bright point may be displayed on the display panel.

SUMMARY

Some embodiments provide a display apparatus which a display quality is improved.

According to embodiments, a display apparatus may include a display panel including a normal pixel and an abnormal pixel having a driving voltage range different from the normal pixel, a gate driver configured to apply a gate signal to the display panel, a gamma reference voltage generator configured to output a first gamma reference voltage group and a second gamma reference voltage group, a data driver configured to output a first data voltage based on the first gamma reference voltage group and a second data voltage based on the second gamma reference voltage group and a driving controller configured to control the gate driver, the gamma reference voltage generator and the data driver. The normal pixel may receive the first data voltage and the abnormal pixel receives the second data voltage. A first voltage range of the first gamma reference voltage group may be inconsistent with a second voltage range of the second gamma reference voltage group.

In an embodiment, the first gamma reference voltage group may be generated by using a first reference voltage and a second reference voltage lower than the first reference voltage. The second gamma reference voltage group may be generated by using a third reference voltage and a fourth reference voltage lower than the third reference voltage. The third reference voltage may be inconsistent with the first reference voltage.

In an embodiment, the third reference voltage may be higher than the first reference voltage.

In an embodiment, the gamma reference voltage generator may include a first gamma reference voltage generator generating the first gamma reference voltage group using a first reference voltage and a second reference voltage lower than the first reference voltage and a second gamma reference voltage generator generating the second gamma reference voltage group using a third reference voltage and a fourth reference voltage lower than the fourth reference voltage. The third reference voltage may be inconsistent with the first reference voltage.

In an embodiment, the first gamma reference voltage group may include a first to N-th normal gamma reference voltages, where N is a positive integer. The second gamma reference voltage group may include a first to N-th abnormal gamma reference voltages, where N is a positive integer. The N-th abnormal gamma reference voltage may be higher than the N-th normal gamma reference voltage.

In an embodiment, the second data voltage based on the second gamma reference voltage group may be only applied to the abnormal pixel.

In an embodiment, the second gamma reference voltage generator may include a first gamma amplifying circuit generating first color abnormal gamma reference voltages corresponding to an image of a first color, a second gamma amplifying circuit generating second color abnormal gamma reference voltages corresponding to an image of a second color inconsistent with the first color and a third gamma amplifying circuit generating third color abnormal gamma reference voltages corresponding to an image of a third color inconsistent with the first color and the second color.

In an embodiment, a first color voltage range of the first color abnormal gamma reference voltages, a second color voltage range of the second color abnormal gamma reference voltages and a third color voltage range of the third color abnormal gamma reference voltages may be different.

In an embodiment, the data driver may include a gamma reference voltage selecting circuit selecting one of the first gamma reference voltage group and the second gamma reference voltage group as a selected gamma reference voltage group, selecting one voltage in the selected gamma reference voltage group, and outputting the one voltage as a selected gamma reference voltage, a first data amplifying circuit outputting the selected gamma reference voltage as the first data voltage to the normal pixel and a second data amplifying circuit outputting the selected gamma reference voltage as the second data voltage to the abnormal voltage.

In an embodiment, the gamma reference voltage selecting circuit may include a first decoder receiving the first gamma reference voltage group and the second gamma reference voltage group, outputting the first gamma reference voltage group to a second decoder, and outputting the second gamma reference voltage group to a third decoder. The second decoder may output a first selected gamma reference voltage selected from the first gamma reference voltage group and the third decoder may output a second selected gamma reference voltage selected from the second gamma reference voltage group.

In an embodiment, the first data amplifying circuit may output the first data voltage by amplifying the first selected gamma reference voltage. The second data amplifying circuit may output the second data voltage by amplifying the second selected gamma reference voltage.

In an embodiment, the second voltage range may be wider than the first voltage range.

In an embodiment, the driving controller may output a normal data signal and an abnormal data signal to the data driver. The first data voltage may be generated based on the normal data signal and the second data voltage is generated based on the abnormal data signal.

In an embodiment, the abnormal data signal may be a signal for compensating an abnormal characteristic of a pixel in the display panel.

In embodiments, the gamma reference voltage generator and the data driver may be embedded in one integrated data driver.

According to embodiments, a display apparatus may include a display panel including a normal pixel and an abnormal pixel having a driving voltage range different from the normal pixel, a source driver configured to generate a normal data voltage based on a first reference voltage and a second reference voltage lower than the first reference voltage and generate an abnormal data voltage based on a third reference voltage and a fourth reference voltage lower than the third reference voltage and a driving controller configured to control the source driver. The normal data voltage may be applied to the normal pixel. The abnormal data voltage may be applied to the abnormal pixel. The first reference voltage may be inconsistent with the third reference voltage.

In embodiments, the third reference voltage may be higher than the first reference voltage.

In embodiments, the source driver may include a normal gamma reference voltage generator configured to generate a normal gamma reference voltage group using the first reference voltage and the second reference voltage and an abnormal gamma reference voltage generator configured to generate an abnormal gamma reference voltage group using the third reference voltage and the fourth reference voltage.

In embodiments, the source driver may further include a gamma reference voltage selecting circuit configured to select one of the normal gamma reference voltage group and the abnormal gamma reference voltage group as a selected gamma reference voltage group, selecting one voltage in the selected gamma reference voltage group, and outputting the one voltage as a selected gamma reference voltage, a first data amplifying circuit configured to output the selected gamma reference voltage as the normal data voltage and a second data amplifying circuit configured to output the selected gamma reference voltage as the abnormal data voltage.

In embodiments, the third reference voltage may be determined in consideration of a deviation of a characteristic of the abnormal pixel which is caused by a deviation of a manufacturing process.

As described above, according to the display apparatus, a gamma reference voltage generator of the display apparatus may include a first gamma reference voltage generator and a second gamma reference voltage generator. The first gamma reference voltage generator may generate the first gamma reference voltage group based on the first reference voltage and the second reference voltage. The second gamma reference voltage generator may generate the second gamma reference voltage group based on the third reference voltage and the fourth reference voltage. A normal pixel of the display apparatus may emit light based on the first gamma reference voltage group. An abnormal pixel of the display apparatus may emit light based on the second gamma reference voltage group. Additionally, the third reference voltage may be higher than the first reference voltage. Accordingly, the second voltage range applied to the abnormal pixel may be wider than the first voltage range applied to the abnormal pixel. Accordingly, a wide driving voltage range may be applied to the abnormal pixel. Accordingly, the abnormal pixel may not be visible as a dark point or a bright point. Accordingly, the display quality of the display apparatus may be improved.

Additionally, when the first reference voltage is increased to such that the abnormal pixel may not be visible as a dark point or a bright point, power consumption may significantly increase. The abnormal pixel may emit light based on the second gamma reference voltage group. Accordingly, power consumption may be significantly reduced compared to the case where the pixels of the display panel emit light based on the second gamma reference voltage group.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE INVENTIVE CONCEPT

Hereinafter, the present inventive concept will be explained in detail with reference to the accompanying drawings.

Figure 1:
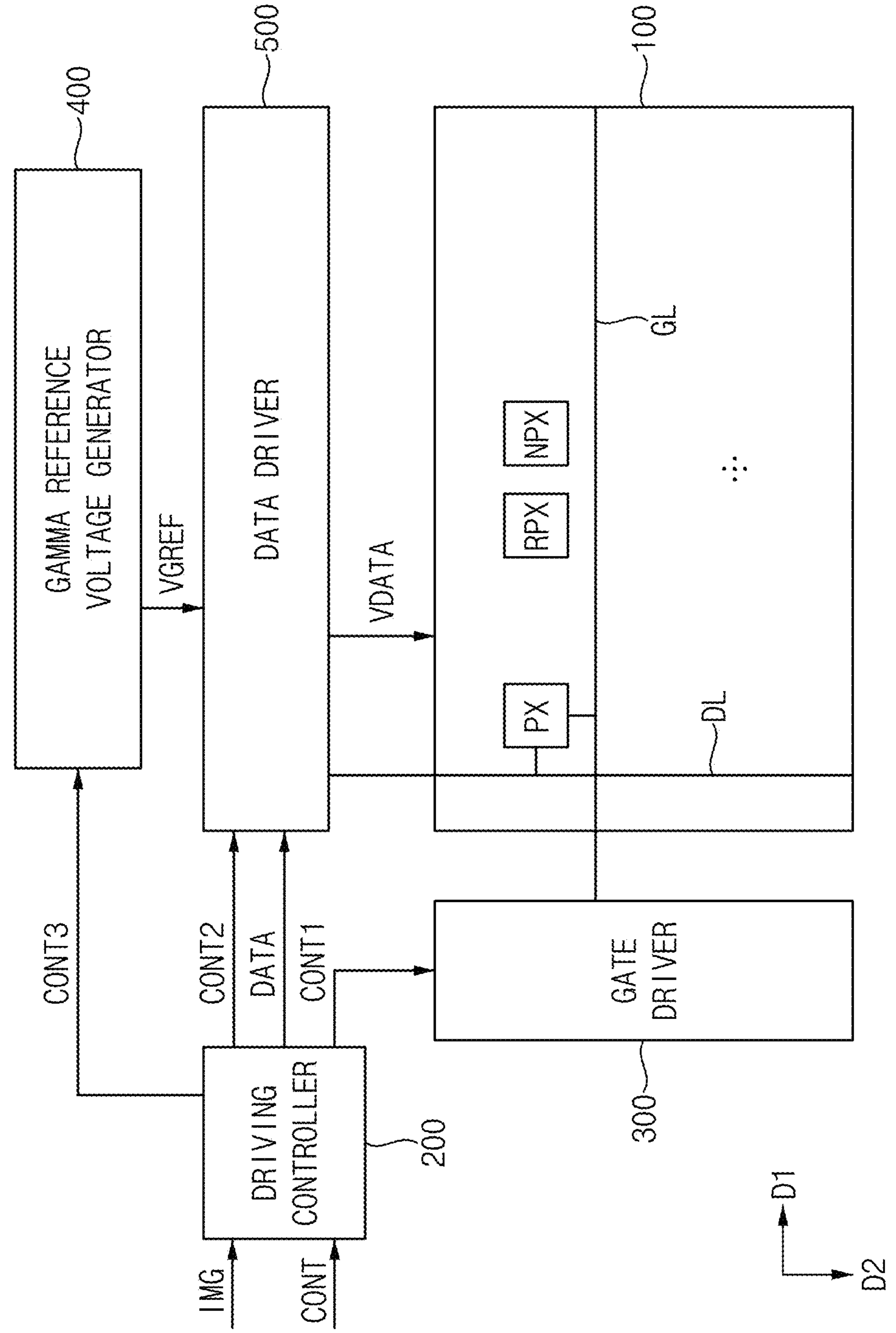
FIG. 1 is a block diagram illustrating a display device according to an embodiment of the present inventive concept.

FIG. 1 is a block diagram illustrating a display device according to embodiments of the present inventive concept.

Referring to FIG. 1, the display device may include a display panel 100 and display panel driver. The display panel driver may include a driving controller 200, a gate driver 300, a gamma reference voltage generator 400 and a data driver 500.

The display panel 100 may have a display region on which an image is displayed and a peripheral region disposed adjacent to the display region.

The display panel 100 may include a plurality of gate lines GL, a plurality of data lines DL and a plurality of pixels PX connected to the plurality of gate lines GL and the plurality of data lines DL. The plurality of gate lines GL may extend in a first direction D1. The plurality of data line DL may extend in a second direction D2 crossing the first direction D1.

In an embodiment, the pixel PX may include a driving transistor and a light emitting element. For example, the driving transistor may generate a driving current based on a data voltage VDATA. For example, the light emitting element may emit light based on the driving current. In an embodiment, the light emitting element may include an organic light emitting diode (OLED), a nano light emitting diode (NED), a quantum dot (QD) light emitting diode, a micro light emitting diode, an inorganic light emitting diode, or any other suitable light emitting element.

In an embodiment, a defect may occur in one of the pixels PX during a manufacturing process of the display apparatus. For example, the pixel PX having the defect may be called as an abnormal pixel RPX. The pixel PX not having the defect may be called as a normal pixel NPX. The abnormal pixel RPX may be visible as a bright point or a dark point. A driving voltage range of the abnormal pixel PX is inconsistent with a driving voltage range of the normal pixel NPX. The driving voltage range may refer to as a range of the data voltage such that the pixel PX emits light with target luminance range. For example, the driving voltage range of the abnormal pixel RPX may be wider than the driving range of the normal pixel NPX. Accordingly, in order for the abnormal pixel RPX to emit light within the luminance range, a voltage range of the data voltage VDATA applied to the abnormal pixel RPX may need to be wide.

The driving controller 200 may receive input image data IMG and an input control signal CONT from an external device. For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a scan clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG and the input control signal CONT. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The gate driver 300 may generate gate signal for driving the gate lines in response to the first control signal CONT1 received from the driving controller 200. The gate driver 300 may output the gate signal to the gate lines.

In an embodiment of the present inventive concept, the gate driver 300 may be integrated on the peripheral region of the display panel 100. In an embodiment of the present inventive concept, the gate driver 300 may be mounted on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF has a value corresponding to each of the data signal DATA. In the present embodiment, the gamma reference voltage VGREF may include a first gamma reference voltage group NVGREF of FIG. 2 for driving the normal pixel. The gamma reference voltage VGREF may include a second gamma reference voltage group RVGREF of FIG. 2 for driving the abnormal pixel.

For example, the gamma reference voltage generator 400 may be disposed in the driving controller 200 or in the data driver 500.

The data driver 500 may receive the second control signal CONT2 and the data signal DATA from the driving controller 200 and receive the gamma reference voltages VGREF from the gamma reference voltage generator 400.

In an embodiment of the present inventive concept, the data driver 500 may be integrated on the peripheral region of the display panel 100. In an embodiment of the present inventive concept, the data driver 500 may be mounted on the peripheral region of the display panel 100.

The data driver 500 may convert the data signal DATA into data voltages VDATA having an analog type using the gamma reference voltages VGREF. The data driver 500 may output the data voltages VDATA to the data line DL.

In an embodiment, the data driver 500 may be implemented with one or more integrated circuits. In another embodiment, the data driver 500 and the driving controller 200 may be implemented as a single integrated circuit and the single integrated circuit may be called a timing controller embedded data driver (TED).

Figure 2:
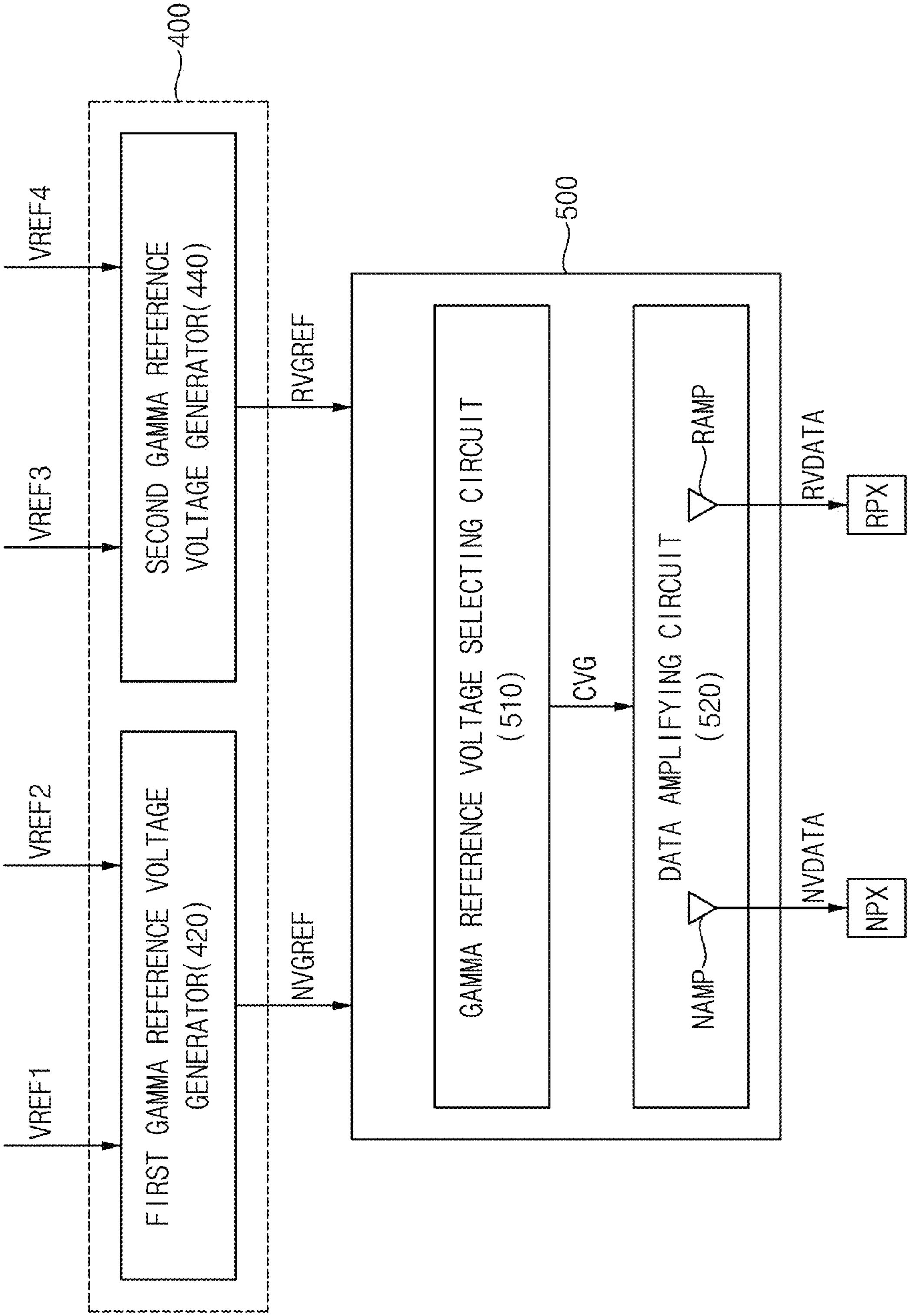
FIG. 2 is a block diagram illustrating an example of a gamma reference voltage generator and a data driver of display apparatus of FIG. 1.

FIG. 2 is a block diagram illustrating an example of a gamma reference voltage generator 400 and a data driver 500 of display apparatus of FIG. 1.

Referring to FIG. 1 and FIG. 2, in the present embodiment, the gamma reference voltage generator 400 may include a first gamma reference voltage generator 420 and a second gamma reference voltage generator 440.

The first gamma reference voltage generator 420 may generate the first gamma reference voltage group NVGREF based on a first reference voltage VREF1 and a second reference voltage VREF2 lower than the first reference voltage VREF1. The normal pixel NPX may be driven based on the first gamma reference voltage group NVGREF. For example, the first gamma reference voltage generator 420 may be called as a normal gamma reference voltage generator. For example, the first gamma reference voltage group NVGREF may be called as a normal gamma reference voltage group.

The second gamma reference voltage generator 440 may generate the second gamma reference voltage group RVGREF based on a third reference voltage VREF3 and a fourth reference voltage VREF4 lower than the second reference voltage VREF2. The abnormal pixel RPX may be driven based on the second gamma reference voltage group RVGREF. For example, the second gamma reference voltage generator 440 may be called as an abnormal gamma reference voltage generator. For example, the second gamma reference voltage group RVGREF may be called as an abnormal gamma reference voltage group.

In the present embodiment, the data driver 500 may include a gamma reference voltage selecting circuit 510 and a data amplifying circuit 520. The data amplifying circuit 520 may include a first data amplifying circuit and a second data amplifying circuit. For example, the first data amplifying circuit may be called as a normal data amplifying circuit. For example, a second data amplifying circuit may be called as an abnormal data amplifying circuit. The first data amplifying circuit may include a first data amplifier NAMP. For example, the first data amplifier NAMP may be called as a normal data amplifier. The second data amplifying circuit may include a second data amplifier RAMP. For example, the second data amplifier RAMP may be called as an abnormal data amplifier.

The gamma reference voltage selecting circuit 510 may receive the first gamma reference voltage group NVGREF and the second gamma reference voltage group RVGREF. The gamma reference voltage selecting circuit 510 may select one of the first gamma reference voltage group NVGREF and the second gamma reference voltage group RVGREF as a selected gamma reference voltage group. The gamma reference voltage selecting circuit 510 may select one voltage of the selected gamma reference voltage group as a selected gamma reference voltage CVG. The gamma reference voltage selecting circuit 510 may apply the selected gamma reference voltage CVG to the data amplifying circuit 520.

For example, the gamma reference voltage selecting circuit 510 may select the first gamma reference voltage group NVGREF as the selected gamma reference voltage group. The gamma reference voltage selecting circuit 510 may select one voltage of the first gamma reference voltage group NVGREF as the first selected gamma reference voltage. The gamma reference voltage selecting circuit 510 may apply the first selected gamma reference voltage to the first data amplifying circuit. The first data amplifying circuit may output a first data voltage NVDATA based on the first selected gamma reference voltage. For example, the first data voltage NVDATA may be called as a normal data voltage. For example, the first data amplifying circuit may output the first data voltage NVDATA by amplifying the first selected gamma reference voltage. The normal pixel NPX may receive the first data voltage NVDATA. The normal pixel NPX may be driven based on the first data voltage NVDATA. For example, the normal pixel NPX may emit light with a luminance corresponding to the first data voltage NVDATA. For example, the normal pixel NPX may emit light within the luminance range.

For example, the gamma reference voltage selecting circuit 510 may select the second gamma reference voltage group RVGREF as the selected gamma reference voltage group. The gamma reference voltage selecting circuit 510 may select one voltage of the second gamma reference voltage group RVGREF as the second selected gamma reference voltage. The gamma reference voltage selecting circuit 510 may apply the second selected gamma reference voltage to the second data amplifying circuit. The second data amplifying circuit may output a second data voltage RVDATA based on the second selected gamma reference voltage. For example, the second data voltage RVDATA may be called as an abnormal data voltage. For example, the second data amplifying circuit may output the second data voltage RVDATA by amplifying the second selected gamma reference voltage. The abnormal pixel RPX may receive the second data voltage RVDATA. The abnormal pixel NPX may be driven based on the second data voltage RVDATA. For example, the abnormal pixel RPX may emit light with a luminance corresponding to the second data voltage RVDATA. In an embodiment, the second gamma reference voltage group RVGREF may be applied to the abnormal pixel RPX and may not be applied to the normal pixel NPX.

In the present embodiment, the first reference voltage VREF1 is inconsistent with the third reference voltage VREF3. For example, the third reference voltage VREF may be higher than the first reference voltage VREF1. Accordingly, a second voltage range of the second gamma reference voltage group RVGREF may be wider than a first voltage range of the first gamma reference voltage group NVGREF. For example, the first reference voltage VREF1 may be about 7V, the second reference voltage VREF2 may be about 2V, the third reference voltage VREF3 may be about 8V, and the fourth reference voltage VREF4 may be about 0V. Accordingly, the first voltage range may be about 0V to about 7V and the second voltage range may be about 0V to about 8V. However, the present inventive concept is not limited to a voltage level of the first reference voltage VREF1, the second reference voltage VREF2, the third reference voltage VREF3 and the fourth reference voltage VREF4.

In an embodiment, the third reference voltage GREF3 may be set inconsideration of a difference of characteristics of a pixel in the display panel caused by a deviation of a manufacturing process. For example, due to the deviation of the manufacturing process of the display apparatus, panel characteristics of the display panel 100 may differ depending on manufacturing conditions such as manufacture process, process time, and material, and etc. For example, the pixel PX of the display panel 100 may emit light with different luminance according to the data voltage VDATA. For example, according to the manufacturing conditions, the pixel PX may emit light at a first gray or a second gray different from the first gray according to the reference data voltage. In an embodiment, the third reference voltage VREF3 may be set in consideration of the difference of the characteristics of the pixel caused by the deviation of the manufacturing conditions. Accordingly, the effect of the deviation of the manufacturing process may be reduced. Accordingly, the light emission reliability of the pixel PX according to the data voltage VDATA may be improved.

In a conventional display apparatus, a gamma reference voltage generator generates a gamma reference voltage based on a first reference voltage and a second reference voltage. Accordingly, an abnormal pixel which needs to have a wide driving voltage range may be visible as a dark point or a bright point. Accordingly, the display quality of the conventional display apparatus may be deteriorated.

In contrast, the display apparatus according to the present embodiment, the gamma reference voltage generator 400 may include the first gamma reference voltage generator 420 and the second gamma reference voltage generator 440. The first gamma reference voltage generator 420 may generate the first gamma reference voltage group NVGREF based on the first reference voltage VREF1 and the second reference voltage VREF2. The second gamma reference voltage generator 440 may generate the second gamma reference voltage group RVGREF based on the third reference voltage VREF3 and the fourth reference voltage VREF4. The normal pixel NPX may emit light based on the first gamma reference voltage group NVGREF. The abnormal pixel RPX may emit light based on the second gamma reference voltage group RVGREF. Additionally, the third reference voltage VREF3 may be higher than the first reference voltage VREF1. Accordingly, the second voltage range applied to the abnormal pixel RPX may be wider than the first voltage range applied to the abnormal pixel RPX. Accordingly, a wide driving voltage range may be applied to the abnormal pixel RPX. Accordingly, the abnormal pixel RPX may emit light within the luminance range. Additionally, the abnormal pixel RPX may not be visible as a dark point or a bright point. Accordingly, the display quality of the display apparatus may be improved.

Additionally, when the first reference voltage VREF1 is increased for the abnormal pixel RPX to emit light within the luminance range, power consumption may significantly increase. For example, power consumption of the conventional display apparatus may significantly increase. In contrast, the display apparatus according to the present embodiment, the abnormal pixel RPX may emit light based on the second gamma reference voltage group RVGREF. Accordingly, power consumption may be significantly reduced compared to the case where the normal pixel NPX and the abnormal pixel RPX of the display panel 100 emit light based on the second gamma reference voltage group RVGREF.

Figure 3:
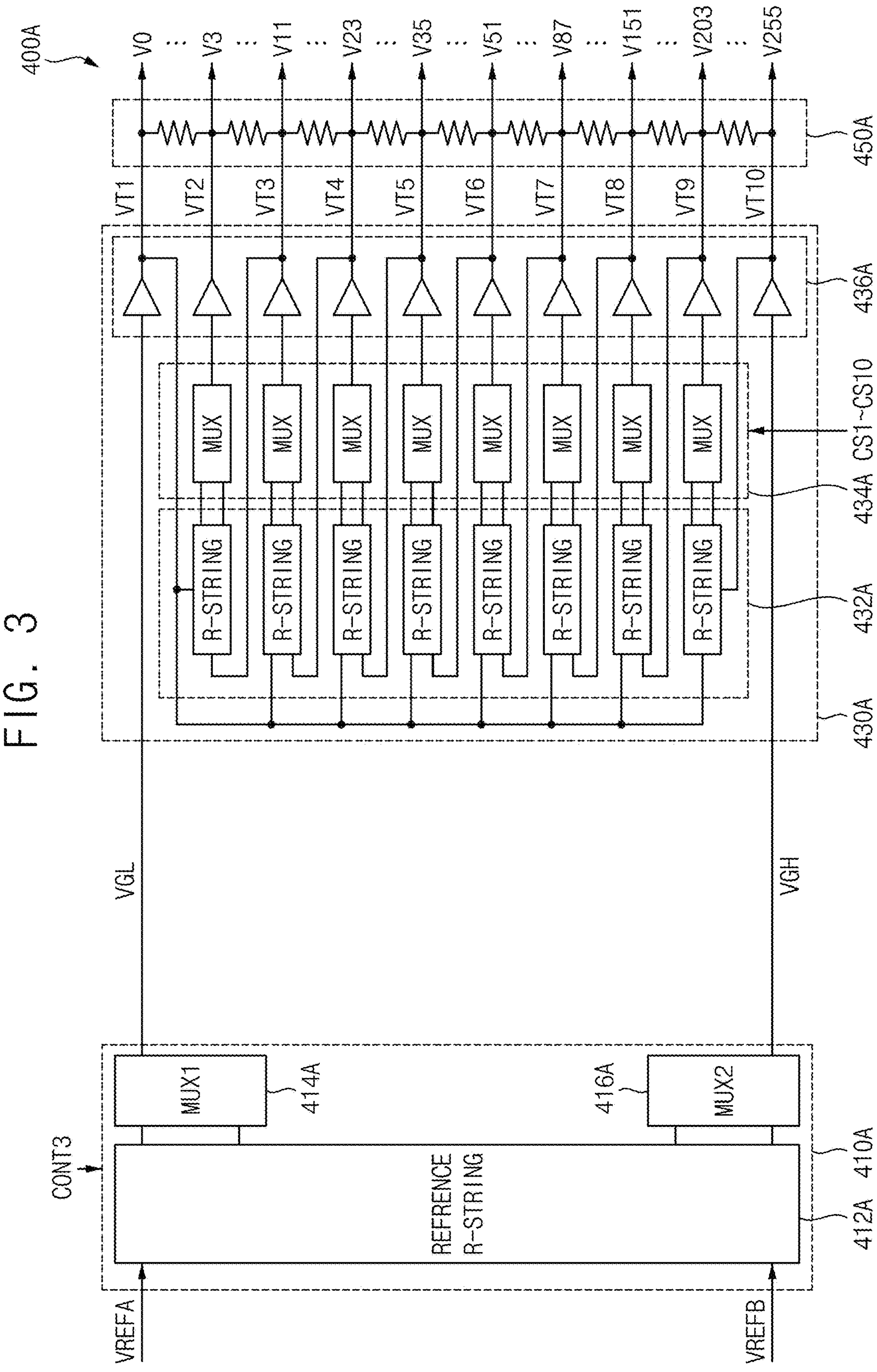
FIG. 3 is a circuit diagram illustrating an example of a gamma reference voltage generator and a gamma reference voltage generating circuit.

FIG. 3 is a circuit diagram illustrating an example of a gamma reference voltage generator 400 and a gamma reference voltage generating circuit 400A.

In an embodiment, a first gamma reference voltage generator 420 may include a gamma reference voltage generating circuit 400A. The second gamma reference voltage generator 440 may include the gamma reference voltage generating circuit 400A. However, the present inventive concept is not limited to the structure of the gamma reference voltage generating circuit 400A disclosed in FIG. 3.

Referring to FIG. 1 to FIG. 3, the gamma reference voltage generating circuit 400A may include a first reference voltage selecting circuit 410A, a second reference voltage selecting circuit 430A and a gamma outputting circuit 450A.

The first reference voltage selecting circuit 410A may receive a high reference voltage VREFB and a low reference voltage VREFA and select a high gamma reference voltage VGH corresponding to maximum gamma tap voltage between the high reference voltage VREFB and the low reference voltage VREFB and a low gamma reference voltage VGL corresponding to minimum gamma tap voltage between the high reference voltage VREFB and the low reference voltage VREFB based on the third control signal CONT3. For example, the high reference voltage VREFB may be the first reference voltage VREF1. For example, the high reference voltage VREFB may be the third reference voltage VREF3. For example, the low reference voltage VREFA may be the second reference voltage VREF2. For example, the low reference voltage VREFA may be the fourth reference voltage VREF4. The high gamma reference voltage VGH and the low gamma reference voltage VGL may be a voltage for generating intermediate gamma reference voltages. For example, the minimum reference voltage may be a ground voltage.

In an embodiment, the first reference voltage selecting circuit 410A may include a reference resistor string 412A, a first reference selecting circuit 414A and a second reference selecting circuit 416A. The reference resistor string 412A may divide a voltage between the high reference voltage VREFB and the low reference voltage VREFA. The reference resistor string 412A may include a plurality of resistors connected in series. The high gamma reference voltage VGH and the low gamma reference voltage VGL may be applied to both ends of the reference resistor string 412A. A plurality of voltages may be distributed and may be outputted at contact points between adjacent resistors included in the reference resistor string 412A. The first reference selecting circuit 414A may select one of voltages divided by the reference resistor string 412A as the low gamma reference voltage VGL. For example, the first reference selecting circuit 414A may be a multiplexer which selects and outputs one of a plurality of input voltages. The second reference selecting circuit 416A may select one of voltages divided by the reference resistor string 412A as the high gamma reference voltage VGH. For example, the second reference selecting circuit 416A may be a multiplexer which selects and outputs one of a plurality of input voltages.

The second reference voltage selecting circuit 430A may generate and output a plurality of gamma tap voltages (i.e., a second gamma tap voltage VT2 to a ninth gamma tap voltage VT9) between the minimum gamma tap voltage (i.e., a first gamma tap voltage VT1) and maximum gamma tap voltage (i.e., a first gamma tap voltage VT1) based on the high gamma reference voltage VGH and the low gamma reference voltage VGL. The second reference voltage selecting circuit 430A may receive the low gamma reference voltage VGL outputted from the first reference selecting circuit 414A and the high gamma reference voltage VGH outputted from the second reference selecting circuit 416A. The second reference voltage selecting circuit 430A may divide a voltage between the high gamma reference voltage VGH and the low gamma reference voltage VGL, and may generate and output the gamma tap voltage VT1 to VT10 by selecting intermediate gamma reference voltages of the divided voltages.

In an embodiment, the second voltage selecting circuit 430A may include a plurality of resistor string 432A, a plurality of gamma tap selecting circuits 434A and gamma amplifiers 436A. The resistor string 432A may be connected in a cascade form to distribute a voltage between the high reference gamma voltage VGH and the low reference gamma voltage VGL. The gamma tap selecting circuits 434A may select a portion of distributed voltages that are generated by the resistor-string 432A based on a plurality of gamma tap selection signals CS1 to CS10. For example, each of the gamma tap selecting circuits 434A may be a multiplexer that selects one of a plurality of input voltages. In this case, the gamma tap selection signals CS1 to CS10 may be selected by an input of the user or by an external input or may be stored during a manufacturing process.

The second reference voltage selecting circuit 430A may have a cascade structure. The second reference voltage selecting circuit 430A may include a plurality of stages. For example, second reference voltage selecting circuit 430A may include first to tenth stages that output the first to tenth gamma tab voltages VT1 to VT10.

The first stage may output the low reference gamma voltage VGL as the first gamma tab voltage VT1. The first gamma tab voltage VT1 may correspond to the gamma voltage V0 of the zero gray. The Kth stage that outputs the Kth gamma tab voltage (where K is an integer between 2 and 9) may include a resistor-string, a gamma tap selecting circuit and the gamma amplifier. The Kth stage may distribute the first gamma tab voltage VT1 and the (K+1)th gamma tab voltage using the resistor-string, may select one of distributed voltages that are generated by the gamma tap selecting circuit and may output the selected voltage as the Kth gamma tab voltage using the gamma amplifier. For example, the second stage may distribute the first gamma tab voltage VT1 and the third gamma tab voltage VT3 using the resistor-string, may select one of distributed voltages that are generated by the gamma tap selecting circuit and may output the selected voltage as the second gamma tab voltage VT2 using the gamma amplifier. The second gamma tab voltage VT2 may correspond to the gamma voltage V3 of the three gray. The tenth stage may output the low reference gamma voltage VGL as the tenth gamma tab voltage VT10. The tenth gamma tab voltage VT10 may correspond to the gamma voltage V255 of the 255 gray.

The gamma outputting circuit 450A may distribute the gamma tab voltages VT1 to VT10 to output the gamma voltages V0 to V255 corresponding to a gamma curve. In an embodiment, the gamma outputting circuit 450A may generate the gamma voltages V0 to V255 by distributing the gamma tab voltages VT1 to VT10 using the resistor string. However, the present inventive concept is not limited to the number of the gamma voltages which the gamma reference voltage generating circuit 400A may generate. For example, the gamma reference voltage generating circuit 400A may output a gamma reference voltage of 2047 gray.

Figure 4:
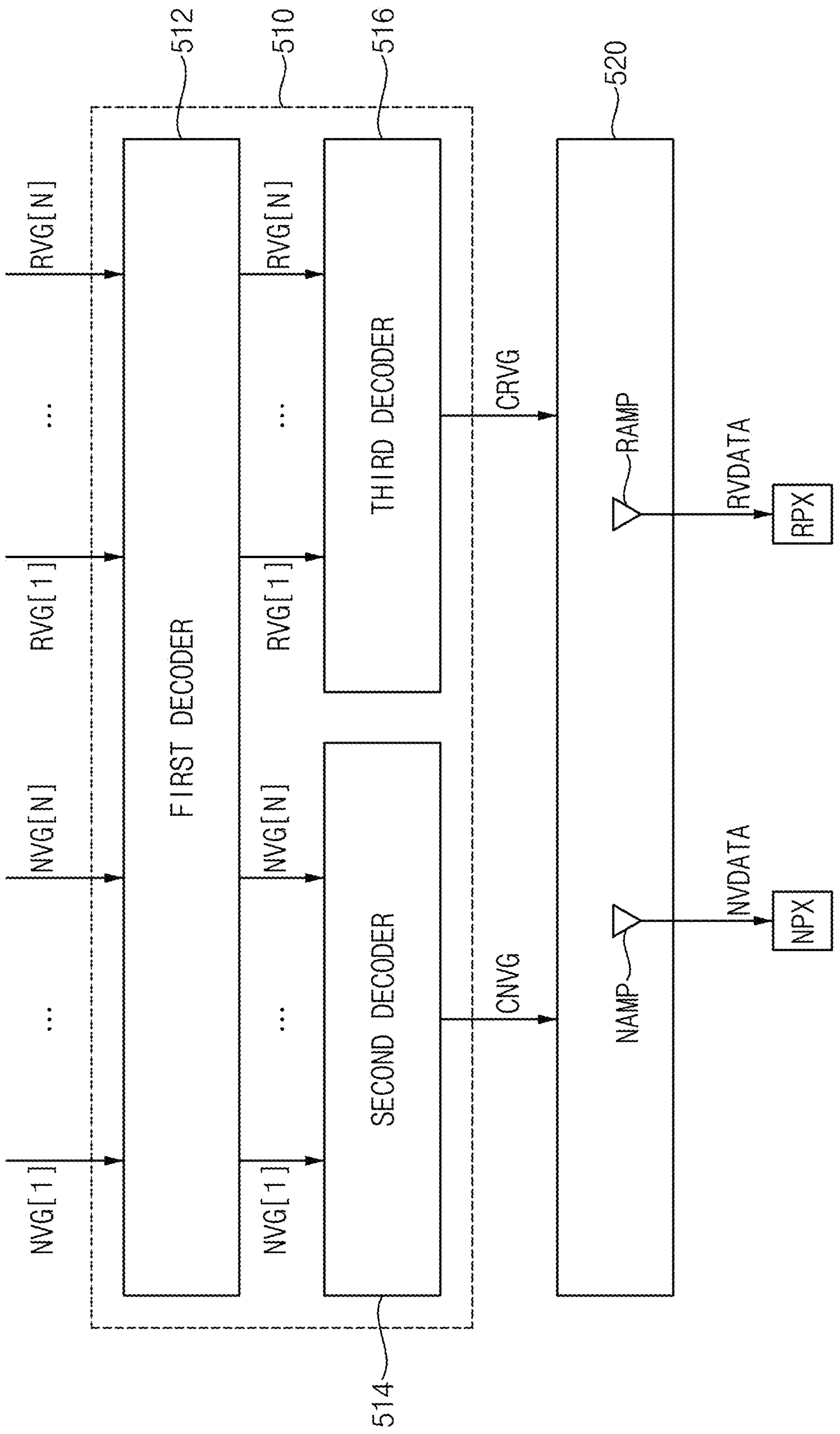
FIG. 4 is a block diagram illustrating an example of a data driver included in a display apparatus of FIG. 1.

FIG. 4 is a block diagram illustrating an example of a data driver included in a display apparatus of FIG. 1.

Referring to FIG. 1 to FIG. 4, the data driver 500 may include the gamma reference voltage selecting circuit 510 and the data amplifying circuit 520. The gamma reference voltage selecting circuit 510 may include a first decoder 512, a second decoder 514 and a third decoder 516.

The first decoder 512 may receive the first gamma reference voltage group NVGREF and the second gamma reference voltage group RVGREF. The first gamma reference voltage group NVGREF may include a first to N-th normal gamma reference voltages NVG[1] to NVG[N]. Herein, N is a positive integer. The second gamma reference voltage group RVGREF may include a first to N-th abnormal gamma reference voltages RVG[1] to RVG[N]. In an embodiment, the first normal gamma reference voltage NVG[1] may correspond to the gamma reference voltage V0 of the 0 gray. In an embodiment, the first abnormal gamma reference voltage RVG[1] may correspond to the gamma reference voltage V0 of the 0 gray. In an embodiment, the N-th normal gamma reference voltage NVG[N] may correspond to the gamma reference voltage V255 of the 255 gray. In an embodiment, the N-th abnormal gamma reference voltage RVG[N] may correspond to the gamma reference voltage V255 of the 255 gray. The first decoder 512 may select one of the first gamma reference voltage group NVGREF and the second gamma reference voltage group RVGREF. The first decoder 512 may select the first gamma reference voltage group NVGREF and apply the first gamma reference voltage group NVGREF to the second decoder 514. For example, the first decoder 512 may output the first to N-th normal gamma reference voltages NVG[1] to NVG[N] to the second decoder 514. The first decoder 512 may select the second gamma reference voltage group RVGREF and apply the second gamma reference voltage group RVGREF to the third decoder 516. For example, the first decoder 512 may output the first to N-th abnormal gamma reference voltages RVG[1] to RVG[N] to the second decoder 516.

The second decoder 514 may select one of the first to N-th normal gamma reference voltages NVG[1] to NVG[N]. The one of the first to N-th normal gamma reference voltages NVG[1] to NVG[N] may be a first selected gamma reference voltage CNVG. For example, the first selected gamma reference voltage CNVG may be called as a selected normal gamma reference voltage. The second decoder 514 may apply the first selected gamma reference voltage CNVG to the first data amplifying circuit.

The third decoder 516 may select one of the first to N-th abnormal gamma reference voltages RVG[1] to RVG[N]. The one of the first to N-th abnormal gamma reference voltages RVG[1] to RVG[N] may be a second selected gamma reference voltage CRVG. For example, the second selected gamma reference voltage CRVG may be called as a selected abnormal gamma reference voltage. The third decoder 516 may apply the second selected gamma reference voltage CRVG to the second data amplifying circuit.

Figure 5:
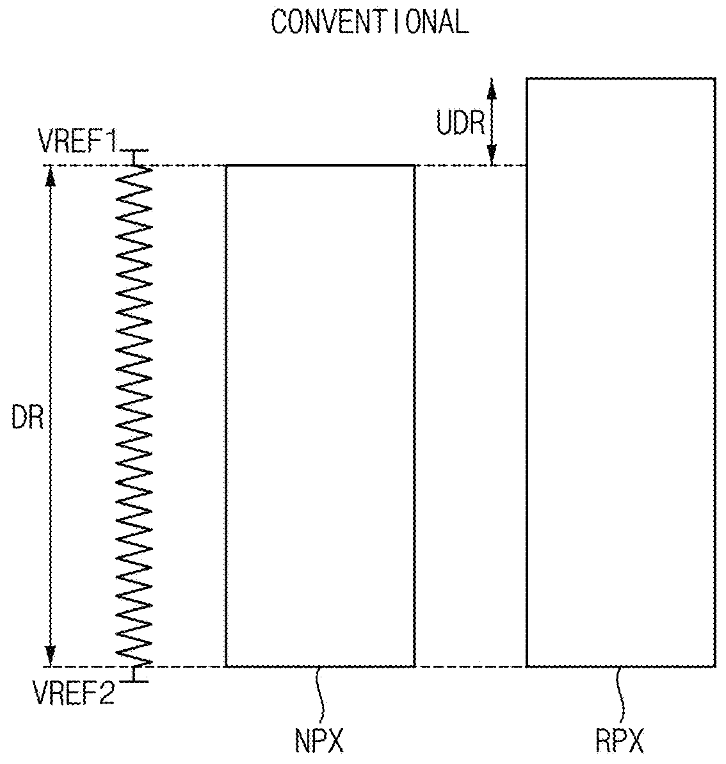
FIG. 5 is a diagram illustrating a driving voltage range of a pixel included in a conventional display apparatus.
Figure 6:
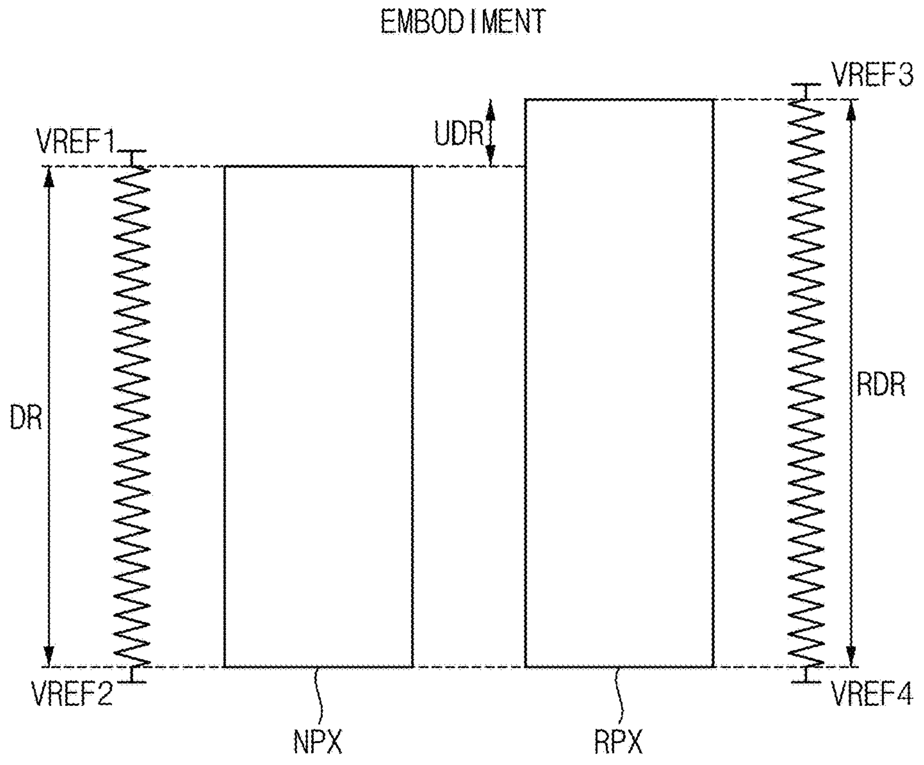
FIG. 6 is a diagram illustrating a driving voltage range of a pixel included in a display apparatus of FIG. 1.
Figure 7:
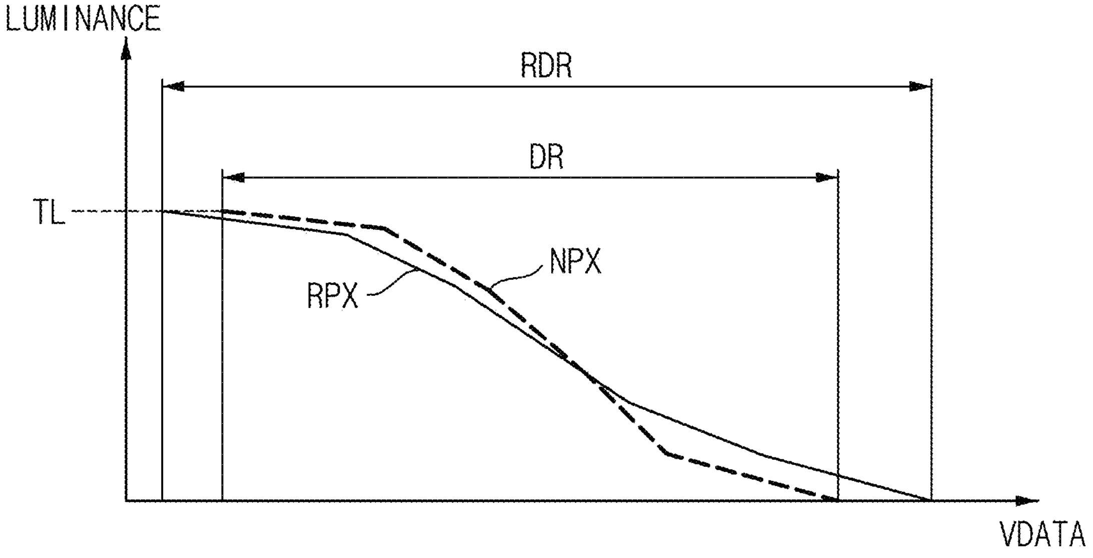
FIG. 7 is a graph illustrating a data voltage applied to a pixel included in a display apparatus of FIG. 1 and luminance.

FIG. 5 is a diagram illustrating a driving voltage range of a pixel included in a conventional display apparatus. FIG. 6 is a diagram illustrating a driving voltage range of a pixel included in a display apparatus of FIG. 1. FIG. 7 is a graph illustrating a data voltage applied to a pixel included in a display apparatus of FIG. 1 and luminance.

Referring to FIG. 5 to FIG. 7, a gamma reference voltage generator of a conventional display apparatus may generate conventional gamma reference voltages based on a first reference voltage and a second reference voltage. Accordingly, an abnormal pixel of the conventional display apparatus which needs to have a wide driving range may be visible as a dark point or a bright point. Accordingly, a display quality of the conventional display apparatus may be deteriorated. For example, the conventional gamma reference voltages may be included in a normal driving voltage range DR. Accordingly, the normal pixel NPX may be driven to emit light up to a target luminance TL in the driving voltage range DR. However, the abnormal pixel RPX may not emit light up to a target luminance TL in the driving voltage range DR. For example, in order for the abnormal pixel RPX to emit light up to target luminance TL, an excess driving voltage range UDR may need to be applied.

In contrast, the normal pixel NPX of the display apparatus according to the present embodiment may emit light based on the first gamma reference voltage group NVGREF. Accordingly, the normal pixel NPX may emit light up to the target luminance TL in the driving voltage range DR. Additionally, the abnormal pixel RPX may emit light based on the second gamma reference voltage group RVGREF. Additionally, the third reference voltage VREF3 may be higher than the first reference voltage VREF1. Accordingly, the second voltage range applied to the abnormal pixel RPX may be wider than the first voltage range applied to the normal pixel NPX. Accordingly, the abnormal pixel RPX may receive a wide driving voltage range. For example, the wide driving voltage range may refer to as an abnormal driving voltage range RDR. Accordingly, the abnormal pixel RPX may emit light up to the target luminance in the abnormal driving voltage range RDR. For example, the abnormal driving voltage range RDR may include the normal driving voltage range DR and the excess driving voltage range UDR. Additionally, the abnormal pixel RPX may not be visible as a dark point and a bright point. Accordingly, a display quality of the display apparatus may be improved.

Figure 8:
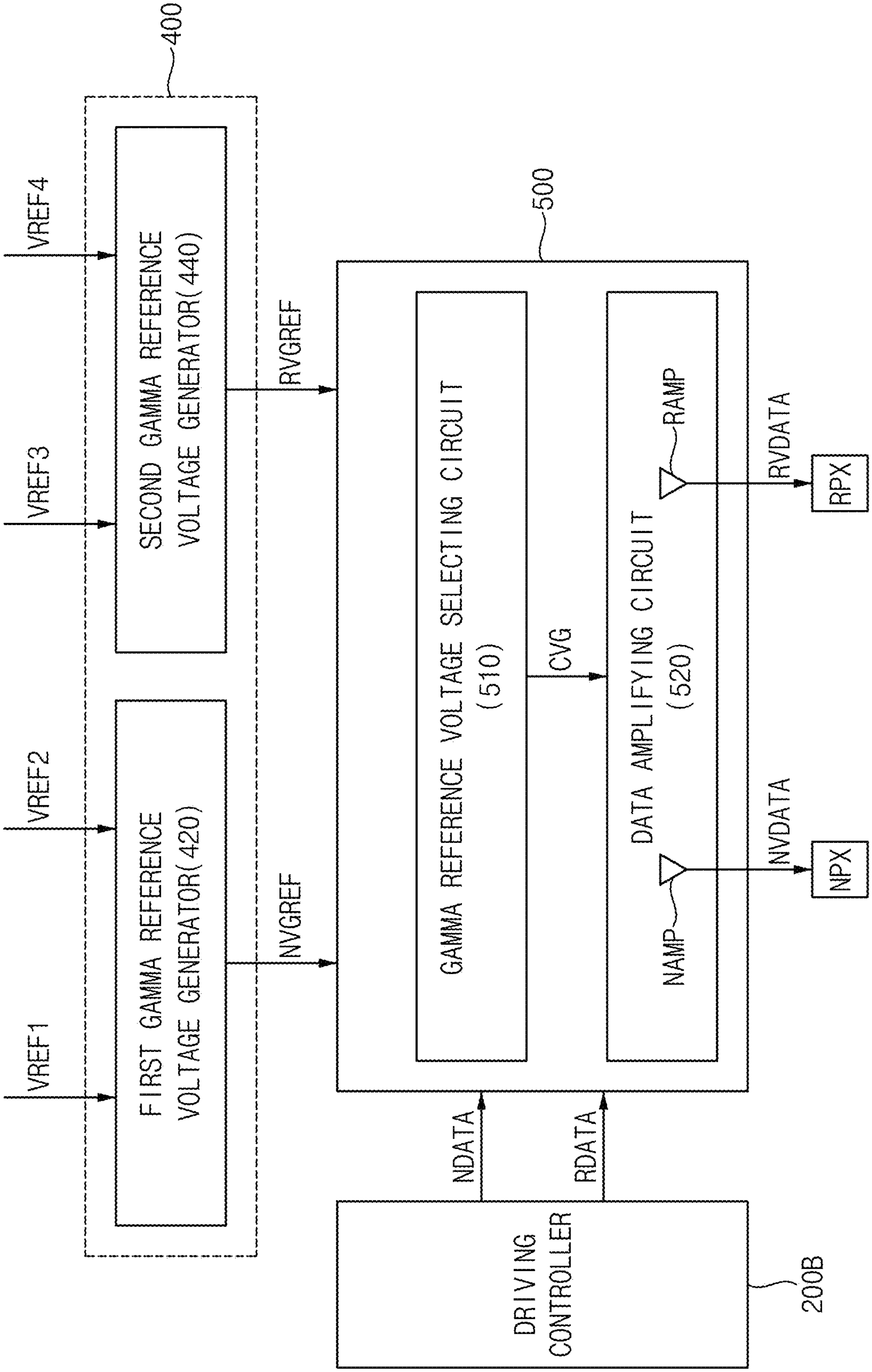
FIG. 8 is a block diagram illustrating an example of a driving controller, a gamma reference voltage generator and a data driver included in a display apparatus of FIG. 1.

FIG. 8 is a block diagram illustrating an example of a driving controller 200B, a gamma reference voltage generator 400 and a data driver 500 included in a display apparatus of FIG. 1.

Referring to FIG. 8, in the present embodiment, the driving controller 200B is substantially the same as the display apparatus described with reference to FIG. 1 to FIG. 7 except that the driving controller 200B outputs a normal data signal NDATA and an abnormal data signal RDATA to the data driver 500, so that the same reference numerals will be used to refer to the same and any repetitive explanation concerning the above elements will be omitted.

In the present embodiment, the driving controller 200B may output the normal data signal NDATA and the abnormal data signal RDATA to the data driver 500. The first data voltage NVDATA may be generated based on the normal data signal NDATA. The second data voltage RVDATA may be generated based on the abnormal data signal RDATA. The abnormal data signal RDATA may be a signal for compensating the deviation of the characteristics of the pixel caused by the process deviation of the manufacturing process of the display apparatus. For example, due to the deviation of the characteristics of the pixel, the pixel receiving the reference data voltage may not emit light of a second gray but emit light of a first gray. The abnormal data signal RDATA may be a signal for compensating a difference between the first gray and the second gray. Accordingly, in order for the pixel PX to emit light as the first gray, the reference data voltage may be controlled. Accordingly, an influence of the process deviation of the manufacturing process may be reduced. Accordingly, an emission reliability of the pixel PX according to the data voltage VDATA may be improved.

Figure 9:
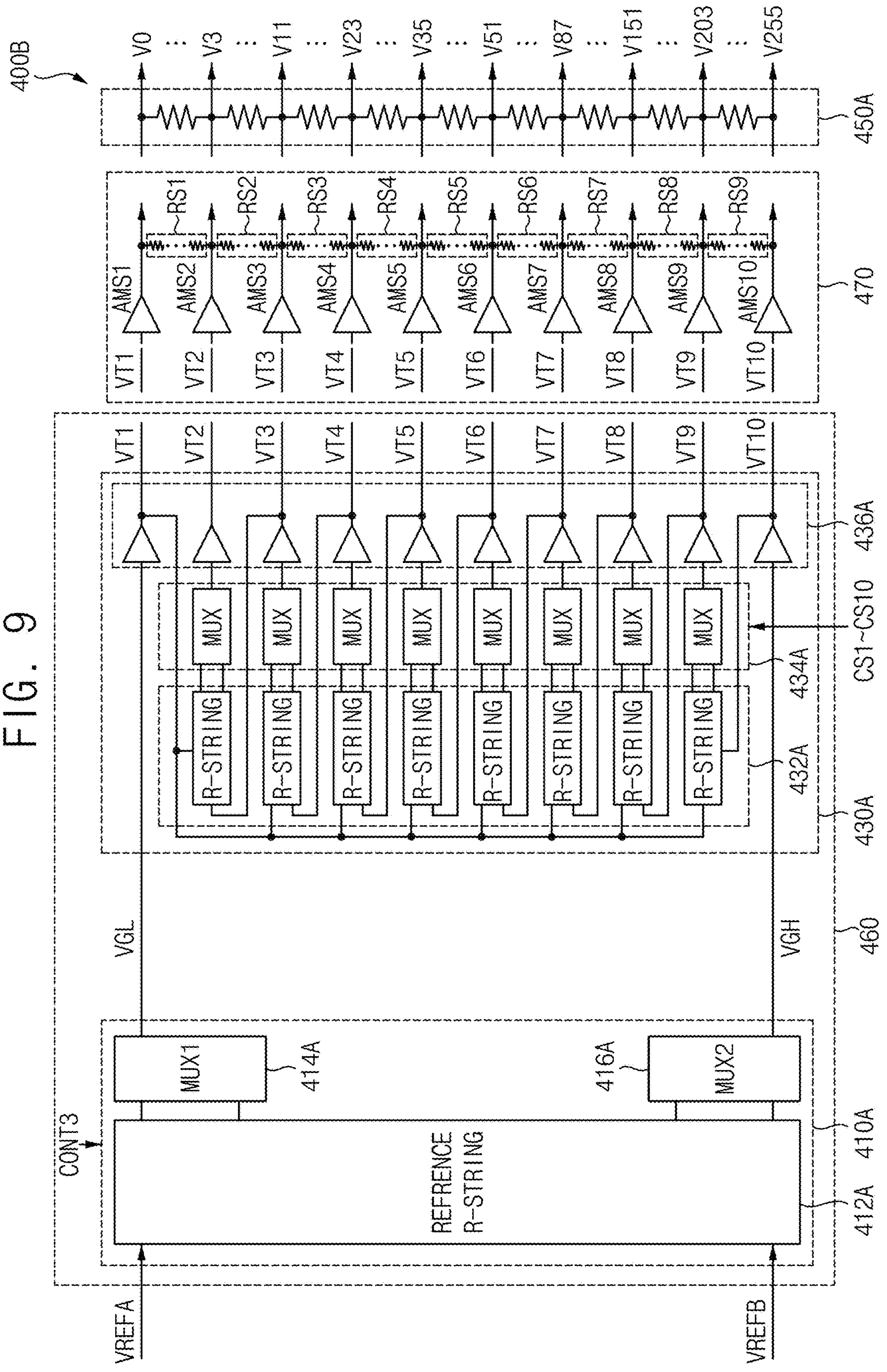
FIG. 9 is a circuit diagram illustrating an example of a gamma reference voltage generating circuit of a gamma reference voltage generator included in the display apparatus of FIG. 1.

FIG. 9 is a circuit diagram illustrating an example of a gamma reference voltage generating circuit 400B of a gamma reference voltage generator 400 included in the display apparatus of FIG. 1.

Referring to FIG. 2 and FIG. 9, in an embodiment, the second gamma reference voltage generator 440 may include a gamma reference voltage generating circuit 400B.

In the present embodiment, the gamma reference voltage generating circuit 400B may include the gamma outputting circuit 450A, a master gamma reference voltage generator 460 including master gamma amplifiers 436A outputting master gamma reference voltages VT1 to VT10 and a slave gamma reference voltage generator 470 including slave gamma amplifiers AMS1 to AMS10 receiving the master gamma reference voltages VG1 to VG10 and outputting the master gamma reference voltages VT1 to VT10 to the data driver 500 and slave resistor strings RS1 to RS9 disposed between the slave gamma amplifiers AMS1 to AMS10. The slave resistor strings RS1 to RS19 of the slave gamma reference voltage generator 470 may output slave gamma reference voltages having levels between the master gamma reference voltages VT1 to VT10.

For example, the master gamma amplifiers 436A and the slave gamma amplifiers AMS1 to AMS10 may have one-to-one correspondence.

In an embodiment, the slave gamma reference voltage generator 470 may include first gamma amplifiers generating a first gamma reference voltage corresponding to an image of a first color, second gamma amplifiers generating a second gamma reference voltage corresponding to an image of a second color and third gamma amplifiers generating a third gamma reference voltage corresponding to an image of a third color.

The first gamma amplifiers may generate a first color abnormal gamma reference voltages corresponding to the image of the first color. The second gamma amplifiers may generate a second color abnormal gamma reference voltages corresponding to the image of the second color different from the first color. The third gamma amplifiers may generate a third color abnormal gamma reference voltages corresponding to the image of the third color different from the first color and second color. For example, a first color voltage range of the first color abnormal gamma reference voltages, a second color voltage range of the second color abnormal gamma reference voltages and a third color voltage range of the third color abnormal gamma reference voltages may be different.

Figure 10:
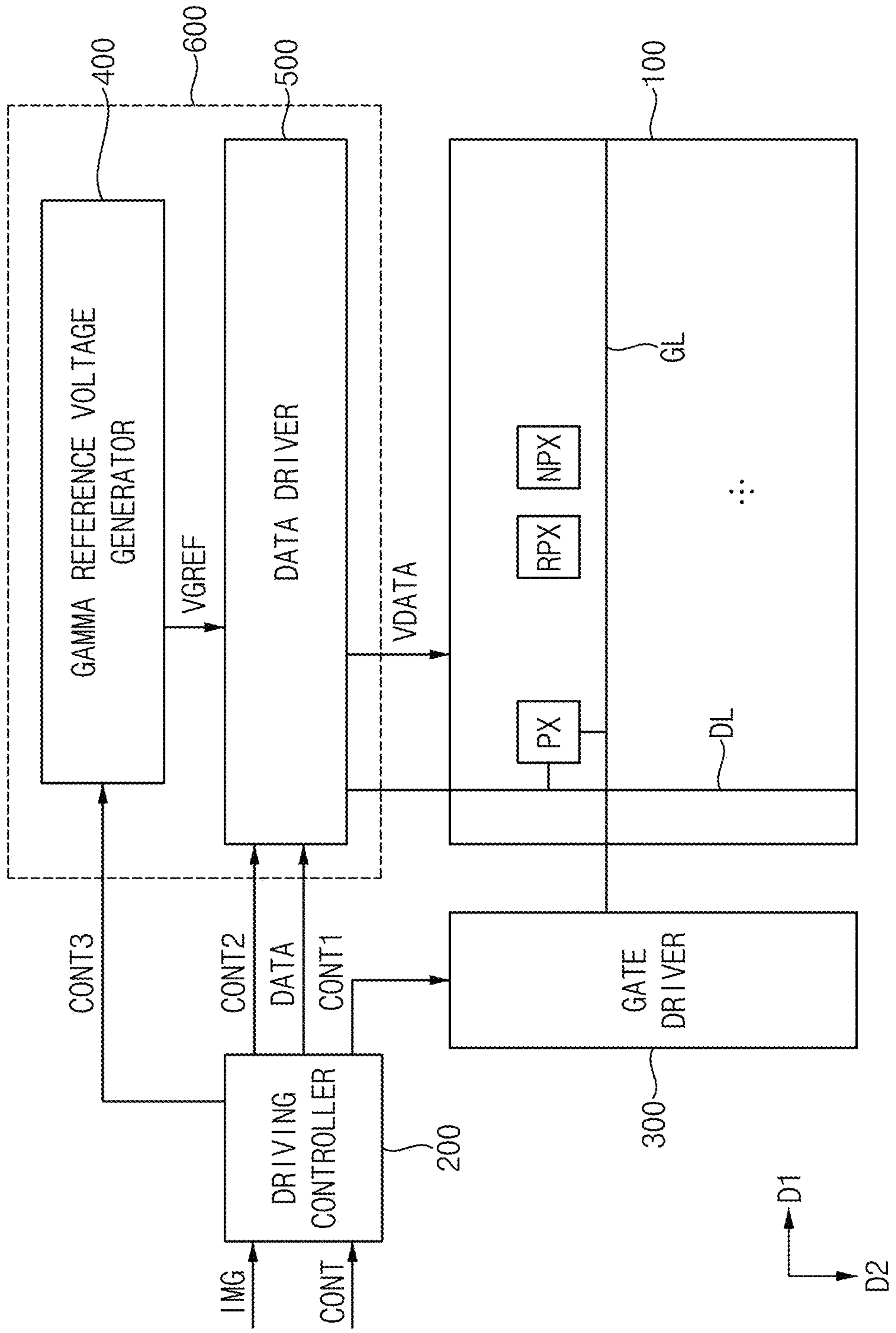
FIG. 10 is a block diagram illustrating a display device according to embodiments of the present inventive concept.

FIG. 10 is a block diagram illustrating a display device according to embodiments of the present inventive concept.

Referring to FIG. 10, in the present embodiment, the gamma reference voltage generator 400 and the data driver 500 may be embedded in a single integrated data driver 600. For example, the single integrated data driver 600 may be called as a source driver.

Figure 11:
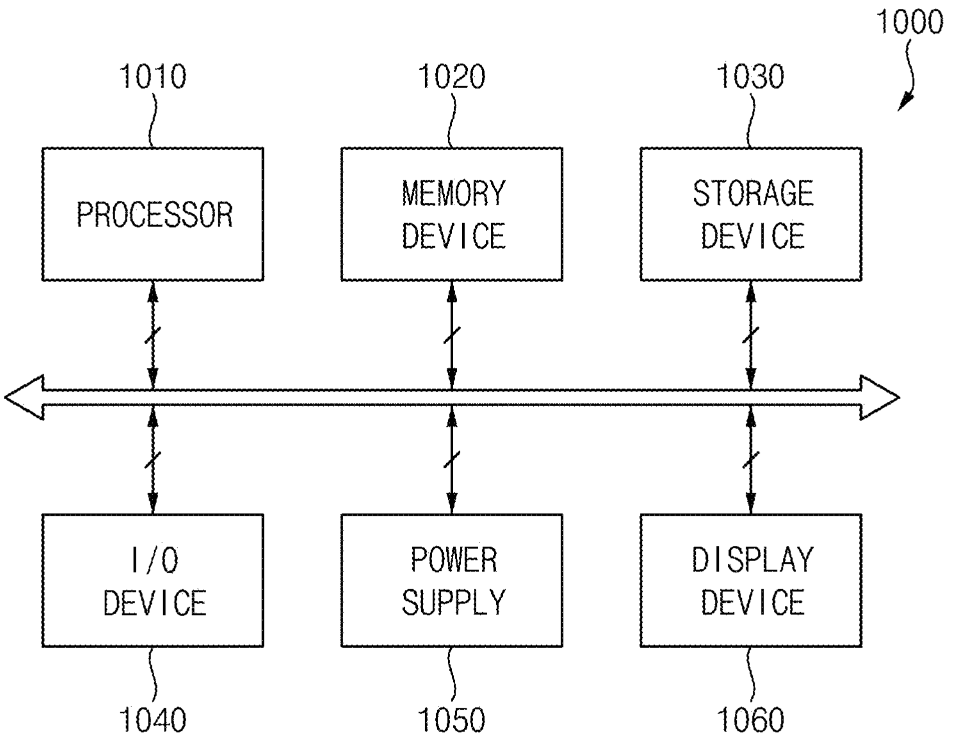
FIG. 11 is a block diagram illustrating an electronic device according to an embodiment of the present inventive concept.
Figure 12:
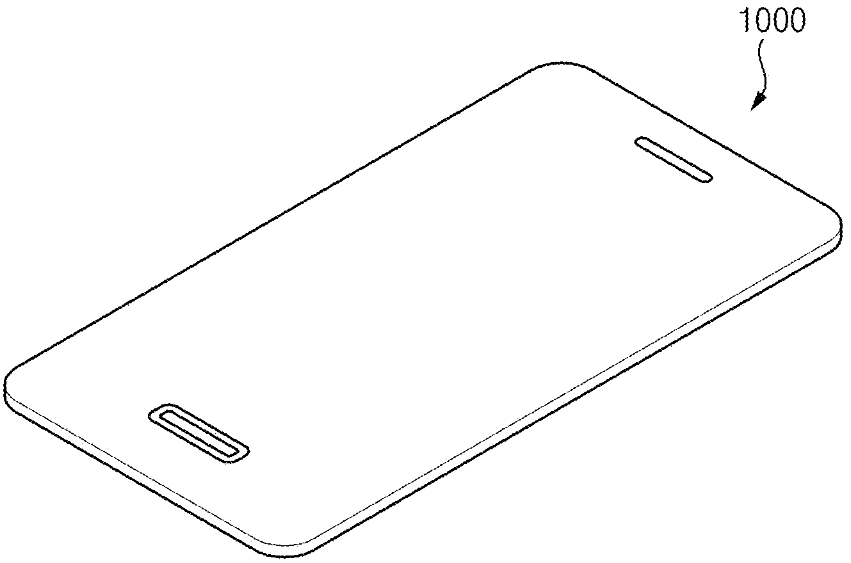
FIG. 12 is a diagram illustrating an example in which the electronic device of FIG. 11 is implemented as a smart phone.

FIG. 11 is a block diagram illustrating an electronic device according to an embodiment of the present inventive concept. FIG. 12 is a diagram illustrating an example in which the electronic device of FIG. 11 is implemented as a smart phone.

Referring to FIG. 11, the electronic device 1000 may include a processor 1010, a memory device 1020, a storage device 1030, an input/output (I/O) device 1040, a power supply 1050, and a display device 1060. Here, the display device 1060 may be the display apparatus of FIG. 1 and/or FIG. 10. In addition, the electronic device 1000 may further include a plurality of ports for communicating with a video card, a sound card, a memory card, a universal serial bus (USB) device, other electronic device, etc.

In an embodiment, as illustrated in FIG. 12, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG, the app-on signal APPON and the input control signal CONT to the driving controller 200 of FIG. 1 and/or FIG. 10.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display device 1060 may be included in the I/O device 1040. The power supply 1050 may provide power for operations of the electronic device 1000. The display device 1060 may be coupled to other components via the buses or other communication links.

Referring to FIG. 12, the electronic device of the present inventive concept is shown implemented as a smartphone, but the present inventive concept is not limited thereto. The electronic device may be a television, a monitor, a laptop computer, or a tablet. Additionally, the electronic device may be a car.

The display device according to the embodiments may be applied to a display device included in a computer, a notebook, a mobile phone, a smart phone, a smart pad, a PMP, a PDA, an MP3 player, or the like.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:

a display panel including a normal pixel and an abnormal pixel having a driving voltage range different from the normal pixel;

a gate driver configured to apply a gate signal to the display panel;

a gamma reference voltage generator configured to output a first gamma reference voltage group and a second gamma reference voltage group;

a data driver configured to output a first data voltage based on the first gamma reference voltage group and a second data voltage based on the second gamma reference voltage group; and a driving controller configured to control the gate driver, the gamma reference voltage generator and the data driver, wherein the normal pixel receives the first data voltage and the abnormal pixel receives the second data voltage, and wherein a first voltage range of the first gamma reference voltage group is inconsistent with a second voltage range of the second gamma reference voltage group.

2. The display apparatus of claim 1, wherein the first gamma reference voltage group is generated by using a first reference voltage and a second reference voltage lower than the first reference voltage, wherein the second gamma reference voltage group is generated by using a third reference voltage and a fourth reference voltage lower than the third reference voltage, and wherein the third reference voltage is inconsistent with the first reference voltage.

3. The display apparatus of claim 2, wherein the third reference voltage is higher than the first reference voltage.

4. The display apparatus of claim 1, wherein the gamma reference voltage generator includes:

a first gamma reference voltage generating circuit generating the first gamma reference voltage group by receiving a first reference voltage and a second reference voltage lower than the first reference voltage; and a second gamma reference voltage generating circuit generating the second gamma reference voltage group by receiving a third reference voltage and a fourth reference voltage lower than the fourth reference voltage, and wherein the third reference voltage is inconsistent with the first reference voltage.

5. The display apparatus of claim 4, wherein the first gamma reference voltage group includes a first to N-th normal gamma reference voltages where N is a positive integer, wherein the second gamma reference voltage group includes a first to N-th abnormal gamma reference voltages, and wherein the N-th abnormal gamma reference voltage is higher than the N-th normal gamma reference voltage.

6. The display apparatus of claim 5, wherein the second data voltage based on the second gamma reference voltage group is only applied to the abnormal pixel.

7. The display apparatus of claim 4, wherein the second gamma reference voltage generating circuit includes:

a first gamma amplifying circuit generating first color abnormal gamma reference voltages corresponding to an image of a first color;

a second gamma amplifying circuit generating second color abnormal gamma reference voltages corresponding to an image of a second color inconsistent with the first color; and a third gamma amplifying circuit generating third color abnormal gamma reference voltages corresponding to an image of a third color inconsistent with the first color and the second color.

8. The display apparatus of claim 7, wherein a first color voltage range of the first color abnormal gamma reference voltages, a second color voltage range of the second color abnormal gamma reference voltages and a third color voltage range of the third color abnormal gamma reference voltages are different.

9. The display apparatus of claim 1, wherein the data driver includes:

a gamma reference voltage selecting circuit outputting a selected gamma reference voltage group by selecting one of the first gamma reference voltage group and the second gamma reference voltage group;

a first data amplifying circuit outputting the first data voltage based on the selected gamma reference voltage group; and a second data amplifying circuit outputting the second data voltage based on the selected gamma reference voltage group.

10. The display apparatus of claim 9, wherein the gamma reference voltage selecting circuit includes:

a first decoder receiving the first gamma reference voltage group and the second gamma reference voltage group, outputting the first gamma reference voltage group to a second decoder, and outputting the second gamma reference voltage group to a third decoder;

the second decoder outputting a first selected gamma reference voltage selected from the first gamma reference voltage group; and the third decoder outputting a second selected gamma reference voltage selected from the second gamma reference voltage group.

11. The display apparatus of claim 10, wherein the first data amplifying circuit outputs the first data voltage by amplifying the first selected gamma reference voltage, and wherein the second data amplifying circuit outputs the second data voltage by amplifying the second selected gamma reference voltage.

12. The display apparatus of claim 1, wherein the second voltage range is wider than the first voltage the first voltage range.

13. The display apparatus of claim 1, wherein the driving controller outputs a normal data signal and an abnormal data signal to the data driver, and wherein the first data voltage is generated based on the normal data signal and the second data voltage is generated based on the abnormal data signal.

14. The display apparatus of claim 13, wherein the abnormal data signal is a signal for compensating a manufacture characteristic of the display panel.

15. The display apparatus of claim 1, wherein the gamma reference voltage generator and the data driver are formed as an integrated data driver.

16. A display apparatus comprising:

a display panel including a normal pixel and an abnormal pixel having a driving voltage range different from the normal pixel;

a source driver configured to generate a normal data voltage based on a first reference voltage and a second reference voltage lower than the first reference voltage and generate an abnormal data voltage based on a third reference voltage and a fourth reference voltage lower than the third reference voltage; and a driving controller configured to control the source driver, wherein the normal data voltage is applied to the normal pixel and the abnormal data voltage is applied to the abnormal pixel, and wherein the first reference voltage is inconsistent with the third reference voltage.

17. The display apparatus of claim 16, wherein the third reference voltage is higher than the first reference voltage.

18. The display apparatus of claim 16, wherein the source driver includes:

a normal gamma reference voltage generator configured to generate a normal gamma reference voltage group by receiving the first reference voltage and the second reference voltage; and an abnormal gamma reference voltage generator configured to generate an abnormal gamma reference voltage group by receiving the third reference voltage and the fourth reference voltage.

19. The display apparatus of claim 18, wherein the source driver further includes:

a gamma reference voltage selecting circuit configured to output a selected gamma reference voltage group by selecting one of the normal gamma reference voltage group and the abnormal gamma reference voltage group;

a first data amplifying circuit configured to output the normal data voltage based on the selected gamma reference voltage group; and a second data amplifying circuit configured to output the abnormal data voltage based on the selected gamma reference voltage group.

20. The display apparatus of claim 16, wherein the third reference voltage is set through considering a manufacture characteristic in a manufacturing process.

* * * * *